Oct. 18, 1927.
M. P. GRAHAM
1,646,288
TIE ROD CONSTRUCTION
Filed Dec. 19, 1925    2 Sheets-Sheet 1
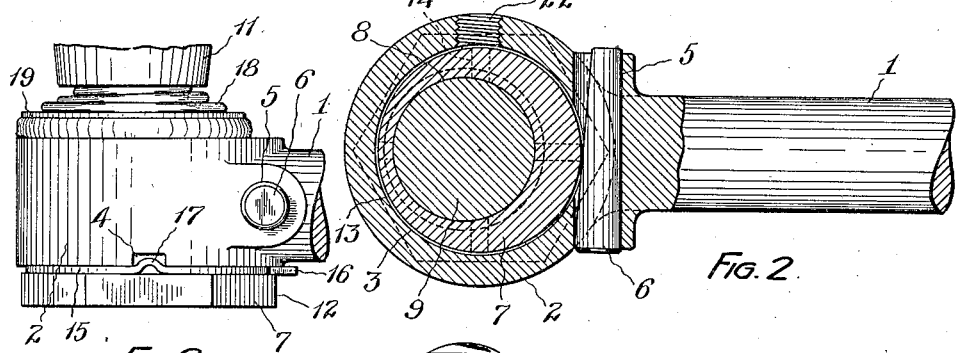
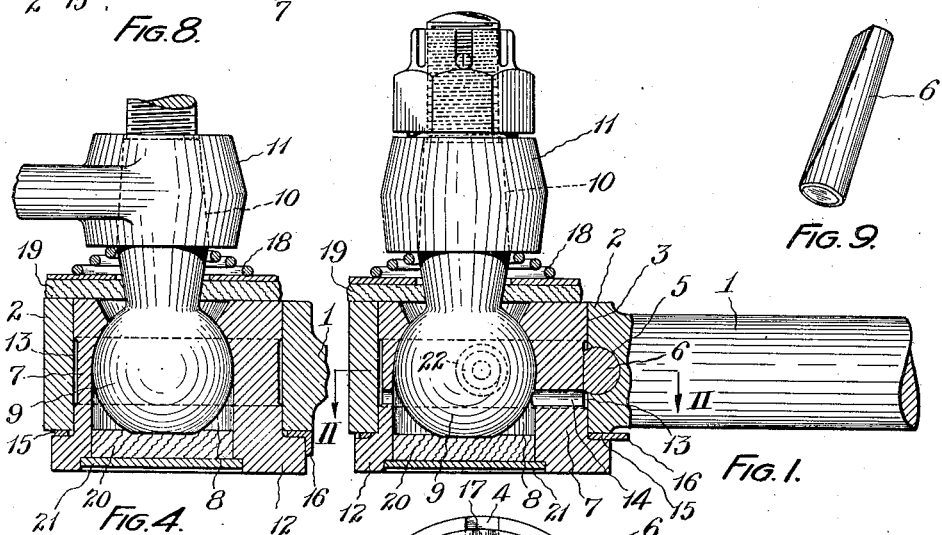
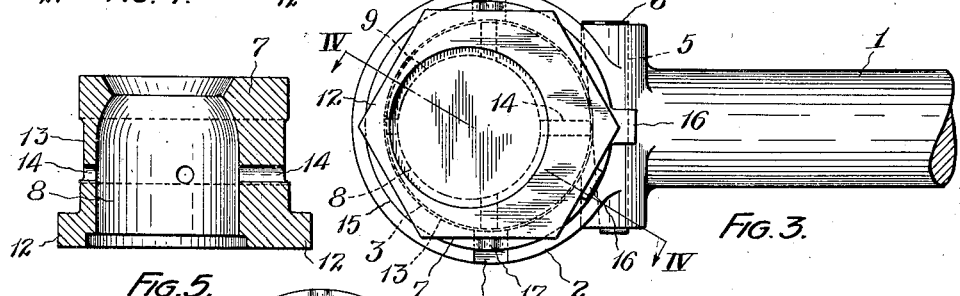
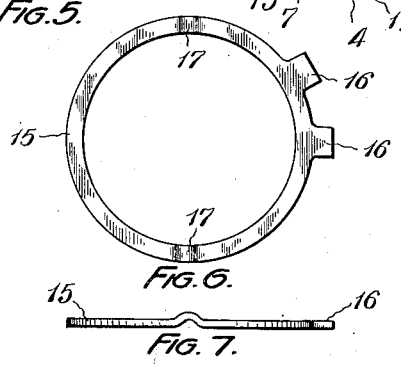
INVENTOR:
MATTHEW P. GRAHAM
By A. E. Merkel,
ATTORNEY.

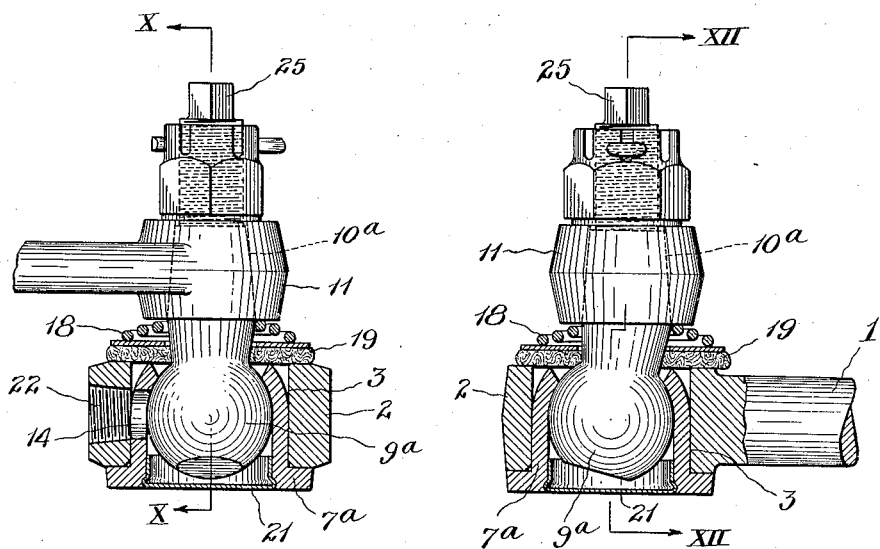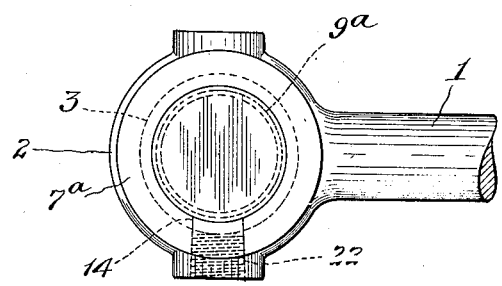

Patented Oct. 18, 1927.

1,646,288

UNITED STATES PATENT OFFICE.

MATTHEW P. GRAHAM, OF DETROIT, MICHIGAN, ASSIGNOR TO THOMPSON PRODUCTS INC., OF CLEVELAND, OHIO, A CORPORATION OF OHIO.

TIE-ROD CONSTRUCTION.

Application filed December 19, 1925. Serial No. 76,448.

The invention relates to connecting rods and universal rod couplings such as are employed in tie rods or connecting rods for automobiles. The tie rod of an automobile is that rod which connects together two rigid arms projecting from the steering knuckles of the front wheels of an automobile, whereby they are caused to turn in unison when one of them is operated by the steering wheel.

For proper steering of an automobile it is necessary to give the front wheels what is known as a "toe-in", i. e., the front wheels must be arranged in planes, not vertical and parallel, but in planes slightly converging toward the front. As the tie rod is rigidly connected to the opposite steering knuckles and as the front stub axles are also rigid therewith, it is apparent that in order to give the front wheels the proper "toe-in" under all conditions, some means of adjustment of the tie rod or joint connections is necessary. In the usual construction, in order to provide this adjustment, the tie rod is made of two end members and an intermediate member, which are relatively adjustable.

It is the object of this invention to utilize a rigid, single piece bar, to form the tie rod, and to so devise a cooperating ball joint as to permit the required adjustment in the joint itself, while maintaining safety and staunchness in all the parts, and a simplicity of construction which will decrease the cost of manufacture.

Another object of the invention is to prevent the joint from rattling and take up wear therein and by the same means close the joint to the entrance of dust and dirt.

The object first stated is attained principally by the employment of a rigid tie rod having transverse apertures through its ends, and a ball stud and bearing therefor one of which is provided with an eccentric part rotatable with respect to the other, by which means the centers between the shanks of the ball studs on opposite ends of the tie rod may be adjusted as desired.

The second stated object is attained by a dust cover over the ball joint with resilient means between it and a connected part. Other advantages are attained by my invention as will fully appear from the description.

The invention consists of the novel construction and arrangement hereinafter described and claimed. The invention is capable of embodiment in various forms and combinations, and in the following description I disclose two forms, each of which has some advantages over the other, but I regard the form shown in Figs. 1 to 9 as preferable under all conditions. These forms I shall now describe.

Referring to the annexed drawings:

Figure 1 is a longitudinal vertical section through the tie rod end and joint;

Fig. 2 is a sectional plan view on the line II—II, of Fig. 1;

Fig. 3 is a bottom plan view of the construction shown in Fig. 1;

Fig. 4 is a section on line IV—IV of Fig. 3;

Fig. 5 is a vertical section through the ball seat;

Fig. 6 is a plan view of a locking washer employed in my invention.

Fig. 7 is an edge view thereof;

Fig. 8 is a fragmentary side elevation of the end of the tie rod and ball joint;

Fig. 9 is a perspective view of a locking pin employed in my invention;

Fig. 10 is a longitudinal vertical cross-section of a modified form of the invention corresponding to Fig. 1 taken on line X—X of Fig. 12;

Fig. 11 is a bottom plan view thereof; and

Fig. 12 is a vertical section on line XII—XII of Fig. 10.

Referring to the drawings in detail, a tie rod 1 preferably of a solid forging, has an enlarged flattened end portion 2 provided with a cylindrical joint receiving aperture 3. The lower edge of the wall of this aperture at the outer end is provided with recesses 4, and the inner wall of the aperture is provided with a cylindrical segmental recess 5 adapted to receive a locking pin 6 of soft metal for purposes which will hereinafter be described. Within this aperture is placed a ball seat 7 having a cylindrical outer surface conforming to the inner cylindrical surface of the aperture 3 and with an inner cylindrical cavity 8 contracted at its upper end to form a spherical segmental bearing surface to co-act with a ball 9 of a ball stud, the shank 10 of which projects through the upper end of the ball seat and about which is engaged an apertured member 11 on the part to be connected with the tie rod. The upper end of the ball stud is threaded to receive a suitable lock nut to hold the parts in connected relation. The lower end of the ball seat is provided with an outwardly projecting flange 12 of polygonal formation; in the drawings the form is that of a hexagon. In the outer surface of the ball seat there is formed an annular lubricant conveying groove 13 which communicates with the interior ball receiving cavity 8 by means of one or more apertures 14. Seated between the lower flange 12 of the ball seat and the tie rod end is a lock washer 15 preferably provided with two locking lugs 16 and an indentation forming a projection 17 as clearly shown in Figs. 6 and 7. When the parts are assembled the projections 17 of the washer enter the recesses 4 in the lower outer edge of the tie rod (see Fig. 8), and one of the lugs 16 is bent downwardly into engagement with one of the flat edge surfaces of the flange 12 of the ball seat (see Fig. 4).

In order to provide a dust cover for the upper side of the ball joint and to prevent rattling thereof I place between the connected member 11 and the upper side of the tie rod end a resilient means such as a coil spring 18 pressing upon a washer 19, preferably consisting of a felt or like member surmounted by a thin metallic plate.

In order to provide means for retaining lubricant in the ball joint and to prevent dust from entering therein the lower end of the ball receiving cavity is sealed in any suitable way, as shown in the drawings by a felt pad 20 held in place by a metallic plate 21.

The ball receiving cavity 8 is placed eccentrically within the ball seat as clearly indicated in the drawings, for the purpose of adjusting the distance between centers of the ball stud shanks. In this feature lies the gist of the invention. In order to effect such adjustment, assuming that the parts are already in working condition, the locking pin 6 is driven out of the recess 5, the turned down lug 16 is disengaged from the face of the flange 12 and by any suitable tool the ball seat is turned in its bearing to any desired position of adjustment. A lug 16 of the locking washer is then bent down into engagement with the flange 12 and the locking pin is again driven into position, whereby the parts are held firmly in their newly adjusted position. The purpose of the locking pin 6 is to firmly engage the ball seat with the end of the tie rod to prevent rattling and assist in locking the ball seat in the tie rod end. This pin is preferably made of soft metal.

In the wall of the joint receiving aperture 3 there is a lubricant inlet aperture 22 preferably threaded to receive the threaded end of any suitable lubricant supply part. When lubricant is applied to the joint it passes around the lubricant conveying groove 13, and through the apertures 14 to the bearing surface of the ball 9.

In Figs. 10, 11 and 12 there is shown another form of the invention above described, in which the adjustment between centers of the ball stud shanks is effected by offsetting the shank of the ball stud with respect to the ball. This form I shall now describe.

The joint receiving aperture 3 in the end of the tie rod 1 is engaged by a ball seat 7ª having an outer cylindrical surface and an interior ball receiving cavity placed concentrically with respect to the outer surface and contracted at its upper end to provide a segmental spherical bearing surface for the ball 9ª of the ball stud, the shank 10ª of which is arranged eccentrically to the ball, as it is clearly indicated in Figs. 10 and 12. In this form lubrication of the joint is provided by alining apertures in the wall of the tie rod end and the ball seat.

In this form in order to adjust the distance between centers of the ball stud shanks the ball stud is rotated in its bearing. To conveniently effect such rotation the upper end of the shank 10ª is provided with a polygonal extension 25 which affords means of engagement for a wrench or other tool.

From the above description it will be seen that I have provided two forms of construction for adjusting the distance between centers of the ball studs of a tie rod connection which attain the objects above indicated. While I have described specific details of the best forms of the invention now known to me it is obvious that the parts may be varied greatly in structure and that different features thereof may be used with other features which may differ greatly from those shown. It is therefore to be understood that the invention includes all constructions comprehended with the terms of the appended claims.

What I claim is:

1. A rod coupling means consisting of a connecting member provided with an aperture at an end thereof, and a ball joint seated in said aperture comprising a tubular ball seat terminating in a spherical segmental bearing surface and a cooperating ball stud, the ball stud having its ball seated in said bearing surface and its shank projecting outwardly, one of the members of said joint having an eccentric part whereby, upon relative rotation thereof the ball stud shank may be adjusted longitudinally of the rod.

2. As an article of manufacture a ball seat having a cylindrical outer surface containing an annular lubricant conveying groove and a ball receiving cavity of general cylindrical form with its axis eccentric to the outer surface and contracted at its upper end to form a spherical segmental bearing, apertures connecting the lubricant conveying groove and the ball receiving cavity, and an outwardly projecting flange at the bottom.

3. A rod coupling comprising a rod having a cylindrical aperture in its end, a ball seat in said aperture adapted to rotate therein and having an interior spherical segmental surface eccentrically located with respect to the axis of rotation of the ball seat, an outwardly extending flange at the lower end of the ball seat, a ball stud seated in the ball seat, a cylindrical segmental recess in the inner wall of the rod aperture, and a locking pin engaging the recess and the outer surface of the ball seat.

4. A rod coupling means consisting of a connecting member provided with an aperture at an end thereof, and a ball joint seated in said aperture comprising a tubular ball seat terminating in a spherical segmental bearing surface and a cooperating ball-stud, the ball-stud having its ball seated in said bearing surface with its shank projecting outwardly, the tubular ball seat having its inner wall eccentric to its outer wall, whereby, upon rotation of the ball seat, the shank of the stud may be adjusted longitudinally of the rod.

5. A rod coupling comprising a rod having a cylindrical aperture in its end, a ball seat in said aperture adapted to rotate therein and having an interior spherical segmental ball bearing surface eccentrically located with respect to the axis of rotation of the ball seat, an outwardly extending flange at the lower end of the ball-seat, and a washer interposed between the ball-seat and the rod and provided with means to lock it to the seat and to the rod.

Signed by me this 25th day of November, 1925.

MATTHEW P. GRAHAM.